United States Patent [19]

Bornstein

[11] 4,137,286

[45] Jan. 30, 1979

[54] METHOD OF MAKING DUAL-THRUST ROCKET MOTOR

[75] Inventor: Lawrence J. Bornstein, Sacramento, Calif.

[73] Assignee: Aerojet-General Corporation, El Monte, Calif.

[21] Appl. No.: 49,390

[22] Filed: Aug. 12, 1960

[51] Int. Cl.² ............................................. C06B 21/00
[52] U.S. Cl. ................................. 264/3 R; 86/1 R; 102/99
[58] Field of Search ............. 18/59 PM, 58 T, 58 TS, 18/58 P, 58 R; 60/35.6; 86/1, 1 R; 264/3, 3 R, 3 B; 102/98

[56] References Cited

U.S. PATENT DOCUMENTS

| 1,670,689 | 1/1926 | Olmstead | 18/59 |
| 2,477,273 | 7/1949 | Tagnola | 18/58 |
| 2,877,504 | 3/1959 | Fox | 18/59 |
| 2,939,275 | 6/1960 | Laedding | 60/35.6 |
| 2,956,401 | 10/1960 | Kane | 60/35.6 |
| 2,994,359 | 8/1961 | Westbrook et al. | 18/59 |

*Primary Examiner*—Peter A. Nelson
*Attorney, Agent, or Firm*—Edward O. Ansell

EXEMPLARY CLAIM

1. A method of making a dual-thrust rocket motor comprising: filling a rocket motor housing with a first propellant grain material, forcing a cured second solid propellant grain centrally within the first propellant grain material and substantially to the bottom thereof, curing the first propellant grain with the second solid propellant grain held in place, and attaching an igniter means and nozzle means to the housing.

9 Claims, 9 Drawing Figures

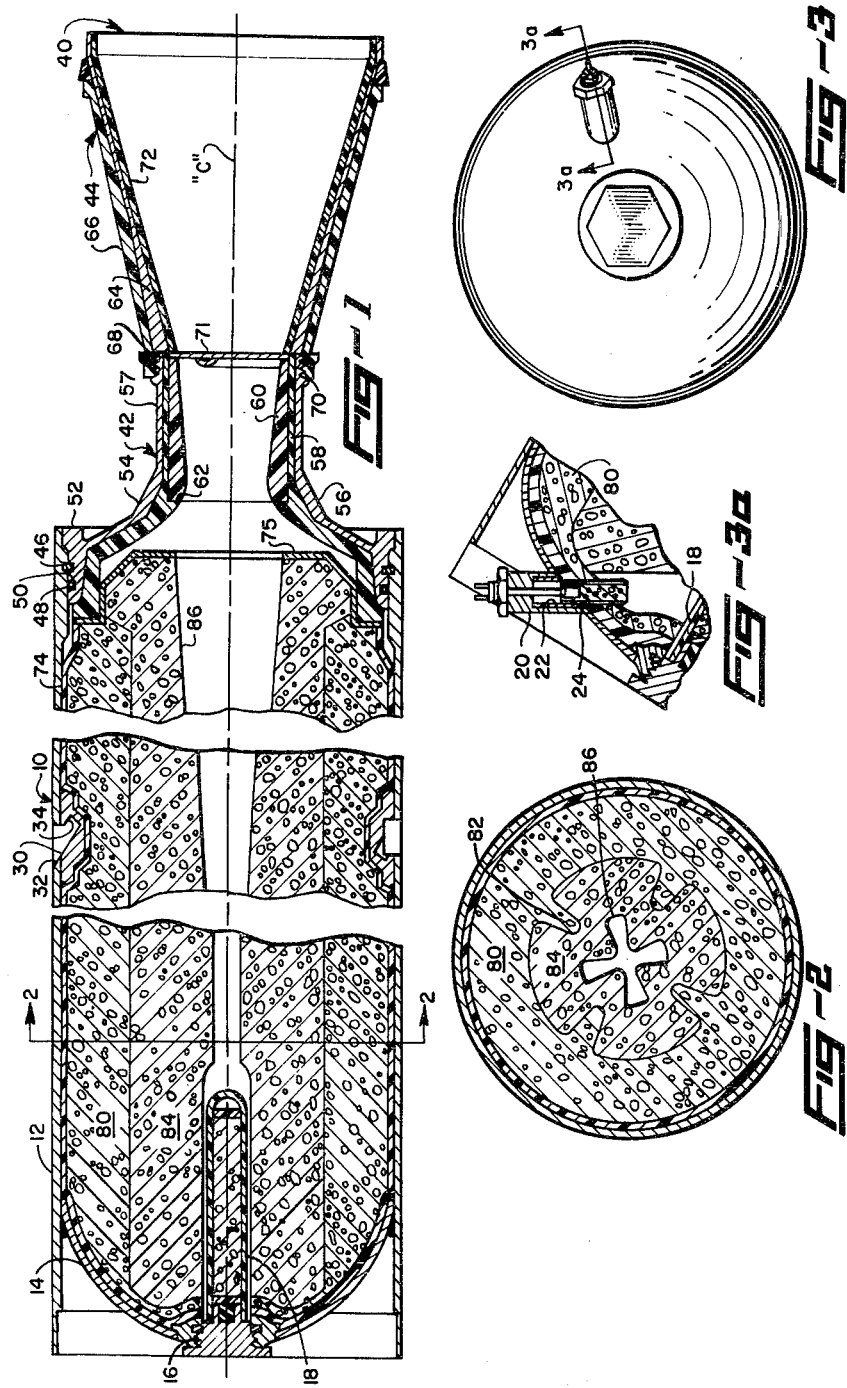

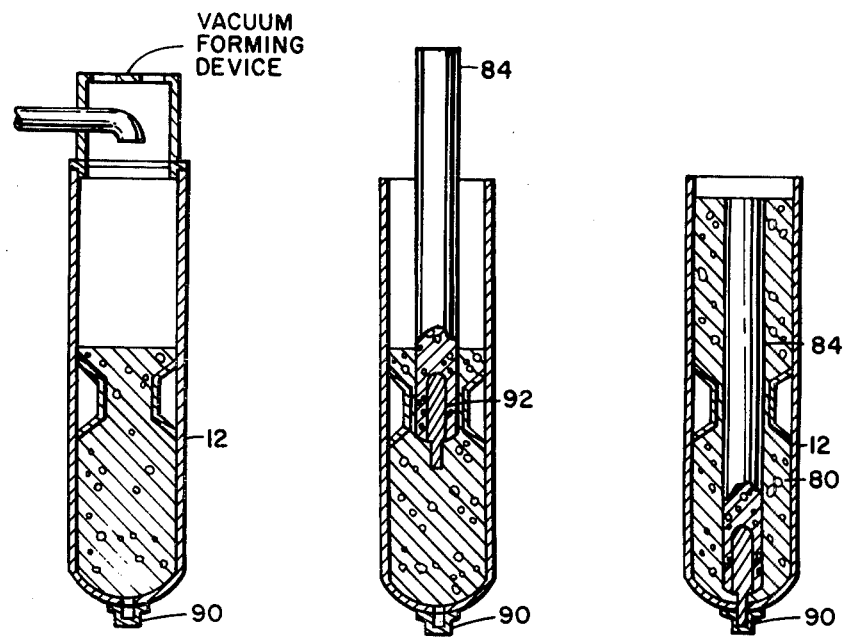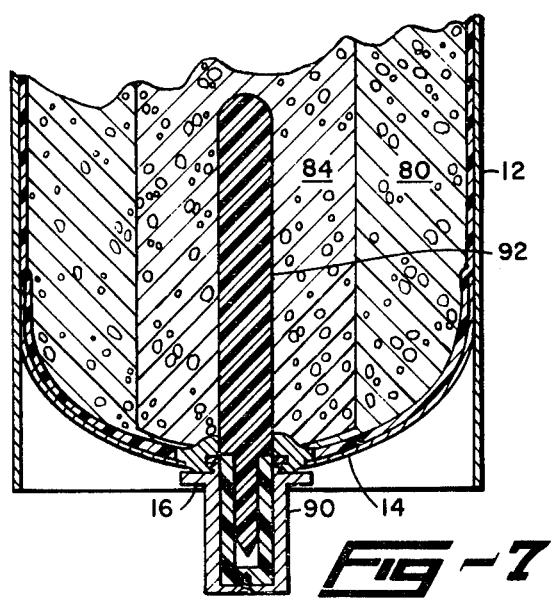

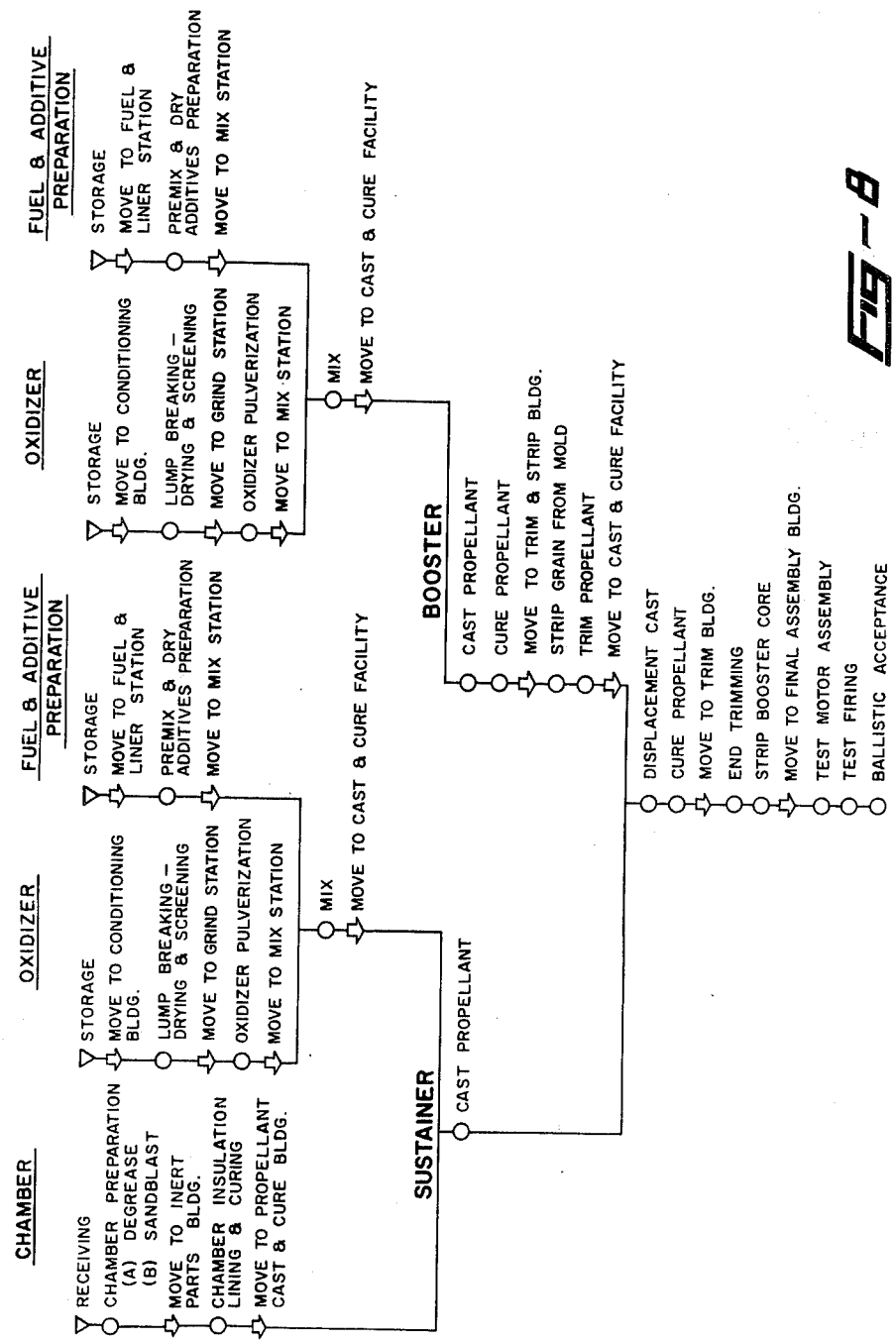

METHOD OF MAKING DUAL-THRUST ROCKET MOTOR

This invention relates to a method of making rocket motors and more particularly to a method of making solid propellant rocket motors operating with a booster.

Certain rocket motors having missions to the outer atmosphere of the earth require booster charges to penetrate the dense atmospheric layers. Boosters have been used which are in essence a second rocket motor that is fixedly attached to the main rocket motor casing. Externally positioned boosters create the inherent problems of disposal of the spent booster casing, alignment of the booster casings in relation to the main rocket motor, and attachment of the booster casings to the main rocket casing.

These problems have been overcome by use of the present invention which, in its broadest aspect, comprises a novel method of fabricating a rocket motor having sustainer and booster propellant grains integrally formed within a single rocket motor housing. The sustainer propellant grain has a plurality of protuberances extending radially inwardly into the surface of the booster grain.

Accordingly, it is an object of the present invention to provide an improved method for fabricating a rocket motor having an integral booster charge.

It is another object of the present invention to provide a novel method of making a dual-thrust rocket motor wherein the housing of the rocket motor is covered along its interior with a layer of heat insulation material, selected areas of which are painted with a parting compound, the rocket motor housing being thereafter filled with a sustainer solid propellant grain material in the fluid state and a cured booster solid propellant grain being forced within the housing to a desired depth, curing of the sustainer solid propellant grain being subsequently effected with the booster solid propellant grain held in place, and an igniter means and nozzle means being attached to the housing to complete the dual-thrust rocket motor.

Other objects and advantages of the present invention, including simplicity and cheapness of manufacture, and convenience in use, will be apparent as the description herein progresses. The foregoing and other objects, embodiments, and features of my invention will be more readily understood by reference to the accompanying drawings in which:

FIG. 1 is a full longitudinal cross sectional view of the integral sustainer and booster propellant grains in a rocket motor constructed in accordance with the method of the present invention, FIG. 2 is a cross section of the rocket motor taken along lines 2—2 in FIG. 1, FIG. 3 is an end view of the igniter and electric squib in position in the rocket motor housing, FIG. 3a is a cross section of the electric squib taken along line 3—3 in FIG. 3, FIG. 4 relates to the process of fabricating the rocket motor and is a graphic drawing of the sustainer propellant poured into the rocket motor housing under a vacuum, FIG. 5 relates to the process of fabricating the rocket motor and is a graphic drawing of the booster propellant grain being inserted in the sustainer propellant, FIG. 6 relates to the process of fabricating the rocket motor and is a graphic drawing of the booster propellant grain fully inserted in the sustainer propellant, FIG. 7 is a partial cross sectional view of the centering device for the booster and sustainer propellant, and FIG. 8 is a flow diagram of the method of making the rocket motor.

Referring to all the figures and more particularly to FIG. 1, there is illustrated a dual-thrust rocket motor 10 having integral booster and sustainer propellant grains. For simplicity, the propulsive portion of the rocket motor has been illustrated, and the warhead portion of the rocket is not shown. A suitable warhead may be fixedly attached to the motor and may contain guidance instruments or explosives.

The rocket motor 10 comprises an elongated cylindrical housing 12 of substantially uniform circular cross section and having a longitudinal axis "C." One end of the housing is closed by an end cap 14 which is fixedly attached thereto, as for example, by welding. A threaded centrally located bore 16 in the end cap 14 receives an igniter 18 that extends inwardly within the rocket motor 10.

As shown in FIG. 3a, a sleeve 20 may be positioned radially to the rocket motor longitudinal axis "C" and fixedly attached to the end cap 14. The sleeve 20 has a passageway 22 therethrough, providing access to the interior of the rocket motor 10 for an electrical squib 24. The igniter 18 and squib 24 are the subject of a copending application bearing Ser. No. 49,383, filed Aug. 12, 1960, now U.S. Pat. No. , 3,182,447, by Lawrence J. Bornstein, and assigned to the same assignee as the subject invention.

As shown in FIG. 1, wing-support annulus-shaped ring 30 is received by the rocket motor housing 12 and is fixedly attached thereto. Suitable fins or wings (not shown) extend through the openings 32 in the housing 12 and are locked into position within the wing-support holes 34 in the ring. These fins or wings may be used for aerodynamic stability.

The nozzle 40 is fixedly attached to the housing 12 on the end opposite the end cap 14. Two major components comprise the nozzle 40 and they are the aft closure 42 and the exit cone 44. A snap-ring 46 provides a locking member by engaging the opposing grooves in the housing 12 and aft closure 42. An "O"-ring seal 48 rests within the groove 50 within the aft closure 42 and is in sealing engagement with the housing 12. The enlarged portion 52 of the aft closure 42 extends rearwardly into a conical section 54 and thereafter into a cylindrical-shaped section 57, all of which are integrally formed. The outer shell 56 of the aft closure 42 is preferably constructed of a metallic material such as steel. A plastic congruent second shell 58 is contiguously formed within the metallic first shell 56 and constructed of material such as fiber glass reinforced phenolic having an asbestos filler for heat insulation purposes. The throat 60 of the nozzle 40 is received by the second shell 58 and abuts the stop 62. The internal configuration of the throat 60 may be of the De Lavac type: The throat 60 may be constructed of heat and erosion resistant materials such as graphite or the like.

The exit cone 44 is composed of a metallic sleeve 64 and a plastic sock 66 contiguously formed therewith. The internal configuration of the metallic sleeve 64 is a continuation of the throat shape. The exit cone 44 and the aft closure 42 are fixedly attached by the mating threads 68, 70. An erosion resistant thermal barrier paint 72 is applied to the interior of the metallic shell 64 and may be a mixture of powdered oxides of zirconium and aluminum suspended in a suitable vehicle. A protector cap 71 may be installed between the aft closure 42 and exit cone 44 to prevent contamination of the rocket motor 10 prior to firing.

The entire interior of the housing and end cap are painted with a heat-insulation material 74 such as a phenolic-asbestos paint.

Sustainer and booster solid propellant grains are formed integrally within the housing 12. The chief difference in physical properties between a booster and a sustainer propellant grain is the relative burning rate and also the specific impulse of the ignited grains. The booster propellant generally has a higher relative burning rate and a higher specific impulse of the ignited grain than the sustainer propellant in order to propel a rocket motor through the earth's atmosphere to a predetermined altitude and velocity as rapidly as possible.

A dual-thrust rocket is broadly a rocket motor having more than one source of thrust and may have booster and sustainer propellant grains attached to the same rocket motor housing.

A first or sustainer solid propellant grain 80 is formed around the internal periphery of the housing 12 in intimate contact with the heat insulation material 74. As shown in FIG. 2, a plurality of protuberances or ribs 82 formed integrally with the sustainer propellant grain 80 project radially inwardly toward the housing longitudinal axis "C" and extend parallel to the same axis. Polyurethane binder propellants may be used for the sustainer propellant grain and a suitable propellant formulation is disclosed in the copending patent application Ser. No. 829,182, filed July 20, 1959, now U.S. Pat. No. 3,132,976, by Karl Klager et al, and assigned to the same assignee as the subject invention.

While polyurethane binder propellants are preferred for purposes of this invention, it is within the scope of the invention to employ any other solid propellant in the rocket motor. For example, resinous binders such as asphalt, rubbers, polysulfides, rubber-polysulfide mixtures, resins, other combustible polymeric organic materials, etc., are all suitable for this purpose. Examples of combustible polymeric organic materials suitable as propellant binders are phenol-aldehyde resins, polyester resins, acrylate resins, and polyalkylene resins.

Solid propellant compositions are ordinarily composed of a resin fuel and an oxidizing material. Examples of suitable oxidizing salts are the chromates, dichromates, permaganates, nitrates, chlorates, and perchlorates of the alkali or alkaline earth metals (such as potassium, sodium, or calcium); ammonia, hydrazine, or guanidine.

A second or booster propellant grain 84 is received by the sustainer propellant grain 80 and is in intimate contact along its entire periphery. In the latter connection, the booster propellant grain 84 is provided with a plurality of radially outwardly opening grooves extending longitudinally thereof which are respectively filled by the radially inwardly projecting ribs 82 of the sustainer propellant grain 80. A star-shaped passageway 86 extends through the entire length of the booster propellant grain and is concentric with the housing longitudinal axis "C." In the present embodiment, the passageway 86 has four interconnected channels extending radially outwardly from the housing longitudinal axis "C." These channels form an extended area of the exposed grain surface thereby aiding ignition thereof. It would be obvious to one skilled in the art to modify the shape of the passageway 86 and to thereby modify the burning time of the propellant. The passageway is tapered to facilitate the removal of a core used in the construction of the booster propellant grain.

A suitable booster propellant would be an aluminized polyurethane binder propellant such as disclosed in the copending patent application Ser. No. 33,054, filed May 31, 1960, now Pat. No. 3,793,099, by Robert L. Duerksen and Joseph Cohen, and assigned to the same assignee as the subject invention.

It is conceivable that the rocket motor 10 would be exposed to ambient temperatures ranging between $-40°$ to $+140°$ F. thereby causing possible stresses to be created within the sustainer and booster propellant grains. Unless precautions are taken to relieve the stresses in the propellant grains, thermal expansion and contraction could cause cracks within the grains. Cracks are detrimental to uniform burning of the propellants and could adversely affect the average and maximum propulsive force created by the rocket motor. Grain cracks at the bond of the propellant to the housing could allow the grain to burn adjacent to the housing thereby causing a hole to be burned through the housing and subsequent loss of gases.

Therefore, a feature of the present invention is the utilization of a band of parting compound 87 applied to the forward and aft sections of the housing 12 to allow the sustainer solid propellant grain to expand and contract under ambient temperature changes.

As an example, in a rocket motor having a housing length of approximately 83 inches and a diameter of 14 inches, a 22 inch band of parting compound 87 is applied to the insulation material 74 in both the forward and aft sections. Additional insulation or restriction material 75 is applied to the rear section of the booster and sustainer propellant grains 80 and 84 adjacent to the nozzle 40 to prevent burning of the grains in that area. A suitable parting compound is microcrystaline wax ($+195°$ F. melting point) or the like. The sustainer solid propellant grain is in intimate contact with the insulation material 74 in the central portion of the housing 12 thus preventing the propellant from moving while the rocket is in motion. The wing support annulus-shaped ring 30 also acts to prevent movement of the propellant grain in flight.

The operation of the above described rocket motor can best be understood by referring to the attached drawings. The rocket motor 10 is placed on a launching platform and directed in a desired projectory. The electric squib 24 is connected to a source of electric current (not shown). The pyrotechnic material within the squib 24 ignites, after current passes therethrough and thereafter burns at a controlled rate. Hot gases generated by the squib 24 are directed at the igniter 18 which is directly in the path of the squib 24. The pyrotechnic material within the igniter 18 is ignited and consumed at a controlled rate. The hot gases generated by the igniter 18 impinge upon the booster propellant charge which is also ignited and burns progressively along the entire periphery and length of the star-shaped passageway 86. It is important to note that as the booster propellant grain burns closer and closer to the sustainer propellant grain, the protuberances or ribs 82 of the sustainer grain 80 are ignited. The position of the ribs filling the grooves within the booster grain 84 insures a positive ignition of the entire sustainer grain. For example, had the sustainer grain only been in abutting relation to the booster grain without the protuberances or ribs, it is possible that the sustainer would not be ignited or possibly would be ignited unevenly causing an erratic propulsive force to be generated.

An example of the dual-thrust rocket in actual physical sizes and shapes is given only for purposes of illustration; a typical rocket motor uses a booster grain weighing 290½ pounds that has a burning time of 5.5 seconds and a sustainer grain weight of 317 pounds with a 26.4 second burning time. Exemplary materials for the booster and sustainer have previously been mentioned. The booster has a maximum pressure of 1794 psia and a maximum thrust of 20,999 pounds. The sustainer has a maximum pressure of 194 psia and a maximum thrust of 875 pounds. The total impulse for the entire rocket is 119,431 pounds per second.

The principal steps of the process of building a dual-thrust rocket motor are set forth in FIGS. 6, 7 and 8 and the block diagram and flow chart shown in FIG. 8.

Starting with the booster propellant grain, a mold is prepered for casting and a core is installed having a shape of the star-shaped passageway. A booster propellant is cast in a vacuum and cured in an appropriate manner as for example in inert atmosphere of dry nitrogen at a positive pressure of 100 psia for 96 hours at +110° F. The booster mold is then stripped off and the grain is thereafter scraped to remove all traces of the mold release compound. An alternate method of casting the booster grain is to cast the grain solid and thereafter to machine the star-shaped passageway after the grain has solidified.

The rocket motor housing 12 is degreased, sandblasted, and the insulation lining 74 is applied and cured. The parting compound is applied to the forward and aft portions of the housing 12.

Referring to FIG. 7, the cap 90 is screwed into the central threaded bore 16 of the end cap 14. A positioning member in the form of a pin 92 is pressed into the central opening in the booster grain 84 to centrally locate the booster grain 84 within the housing 12. A plug (not shown) is inserted in the star-shaped passageway to prevent foreign matter from entering the interior of the booster grain.

As graphically illustrated in FIG. 4, the sustainer propellant is poured to the housing 12 under a vacuum. The booster propellant is thereafter displaced within the sustainer propellant as it is forced into the final position shown in FIGS. 5 and 6. The pin 92 enters the cap 90 centrally locating the booster grain 84. After the sustainer propellant is initially set, the grain is cured in an inert atmosphere of dry nitrogen gas at 100° psig for 24 hours at +70° F. and then for 72 hours at +110° F.

Although certain particular embodiments of the invention are herein disclosed for purposes of explanation, various modifications thereof, after studying the specification, will be apparent to those skilled in the art to which the invention pertains. Reference should accordingly be had to the appended claims in determining the scope of the invention.

I claim:

1. A method of making a dual-thrust rocket motor comprising: filling a rocket motor housing with a first propellant grain material, forcing a cured second solid propellant grain centrally within the first propellant grain material and substantially to the bottom thereof, curing the first propellant grain with the second solid propellant grain held in place, and attaching an igniter means and nozzle means to the housing.

2. A method of making a dual-thrust rocket motor having a rocket motor housing comprising: painting a film of parting compound on the interior of the rocket motor housing at selected areas, filling the rocket motor housing with a first propellant grain material, forcing a cured second solid propellant grain centrally within the first propellant grain material and substantially to the bottom thereof, curing the first solid propellant with the second solid propellant grain held in place, and attaching an igniter means and nozzle means to the housing.

3. A method of making a dual-thrust rocket motor having a rocket motor housing comprising: covering the rocket motor interior with a layer of heat insulation material, painting selected areas of the heat insulation material with parting compound, filling the rocket motor housing with a sustainer solid propellant grain material in the fluid state, forcing a cured booster solid propellant grain within the housing at a desired depth, curing the sustainer solid propellant grain with the booster solid propellant grain held in place, and attaching an igniter means and nozzle means to the housing.

4. A method of making a dual-thrust rocket motor as set forth in claim 3 wherein the booster solid propellant is initially poured in a vacuum in the molding thereof prior to the forcing of the cured booster solid propellant grain within the housing.

5. A method of making a dual-thrust rocket motor as set forth in claim 3 wherein the sustainer solid propellant grain is poured into the rocket motor housing in a vacuum, and the booster solid propellant grain is initially poured in a vacuum in the molding thereof prior to the forcing of the cured booster solid propellant grain within the housing.

6. A method of forming a booster thrust and sustainer thrust solid propellant rocket motor composition comprising the steps of individually mixing at least a first propellant and a second propellant, forming said second propellant in the shape of an elongate member having a plurality of radially outwardly opening grooves extending longitudinally thereof and an axially extending passageway therethrough, curing said second propellant, casting said first propellant in a rocket motor chamber, inserting said cured second propellant into said cast first propellant with the axially extending passageway therethrough being closed, curing said first propellant, and opening the axially extending passageway through said second propellant, whereby a dual thrust propellant composition is formed having an axially extending passageway to facilitate selected burning of said second propellant and wherein said first propellant is provided with a plurality of radially inwardly extending ribs respectively filling the plurality of radially outwardly opening grooves in said second propellant, the ribs being adapted to ignite in advance of ignition of the main body of said first propellant, thereby promoting substantially uniform burning of said first propellant.

7. The method set forth in claim 6 further including the steps of inserting a positioning pin centrally within one end of said second propellant before said first propellant is cured, and engageably retaining said positioning pin within a cap which is centrally positioned in said rocket motor chamber.

8. The method set forth in claim 6 wherein said first propellant is cured by heating in an inert atmosphere after it has initially set.

9. A method of making a dual-thrust rocket motor comprising: filling a rocket motor housing with a first propellant grain material which is poured into the rocket motor housing in a vacuum, forcing a cured second solid propellant grain within the housing to a predetermined depth, curing the first propellant grain with the second solid propellant grain held in place, and attaching an igniter means and nozzle means to the housing.

* * * * *